Oct. 19, 1965    D. W. BANKE    3,212,371
CAM-OPERATED TURNING, BORING AND FACING ATTACHMENT FOR LATHES
Filed June 26, 1962    3 Sheets-Sheet 1

DONALD W. BANKE
*INVENTOR.*

BY James A. Girnan
ATT'Y

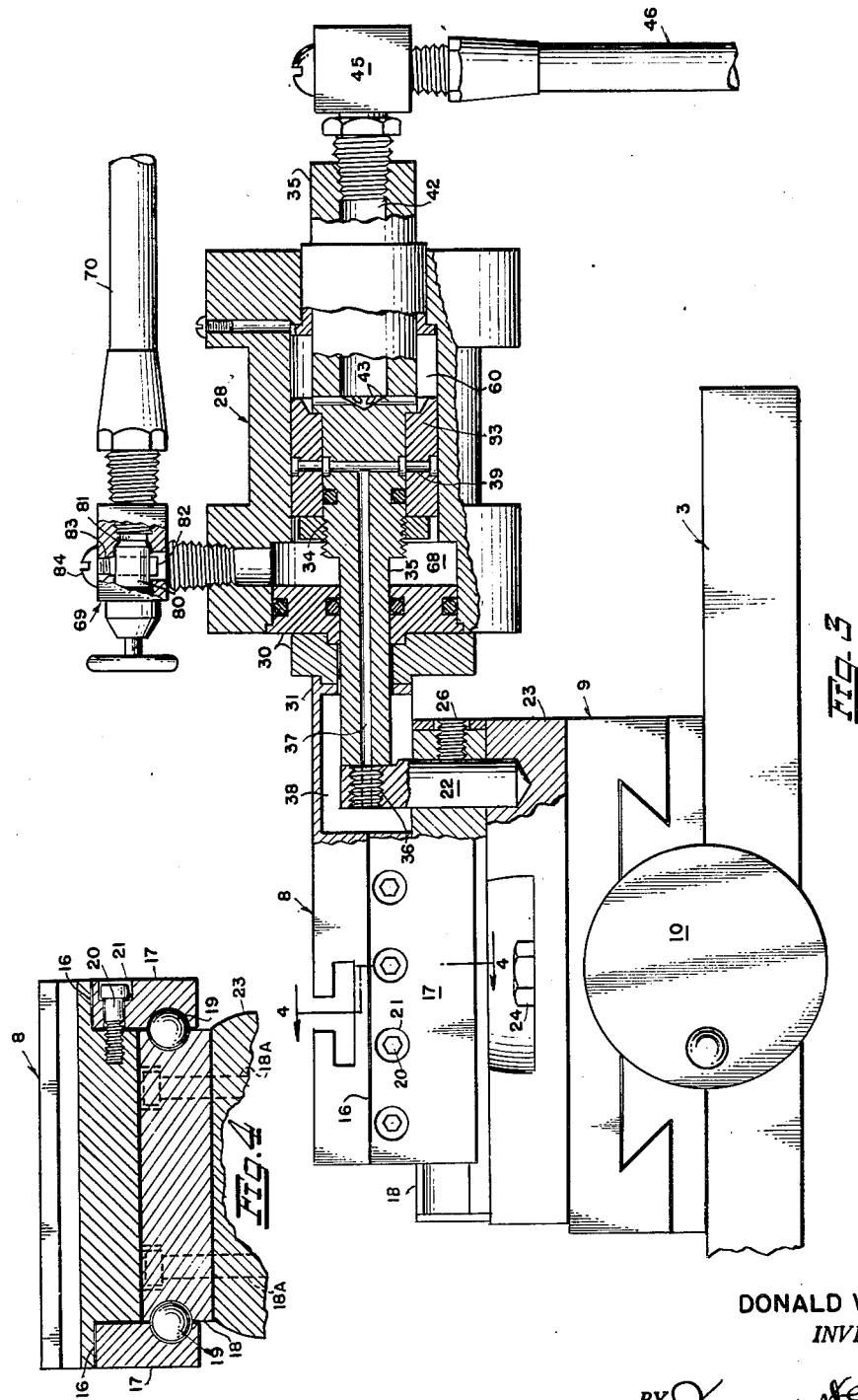

Oct. 19, 1965 D. W. BANKE 3,212,371
CAM-OPERATED TURNING, BORING AND FACING ATTACHMENT FOR LATHES
Filed June 26, 1962 3 Sheets-Sheet 3
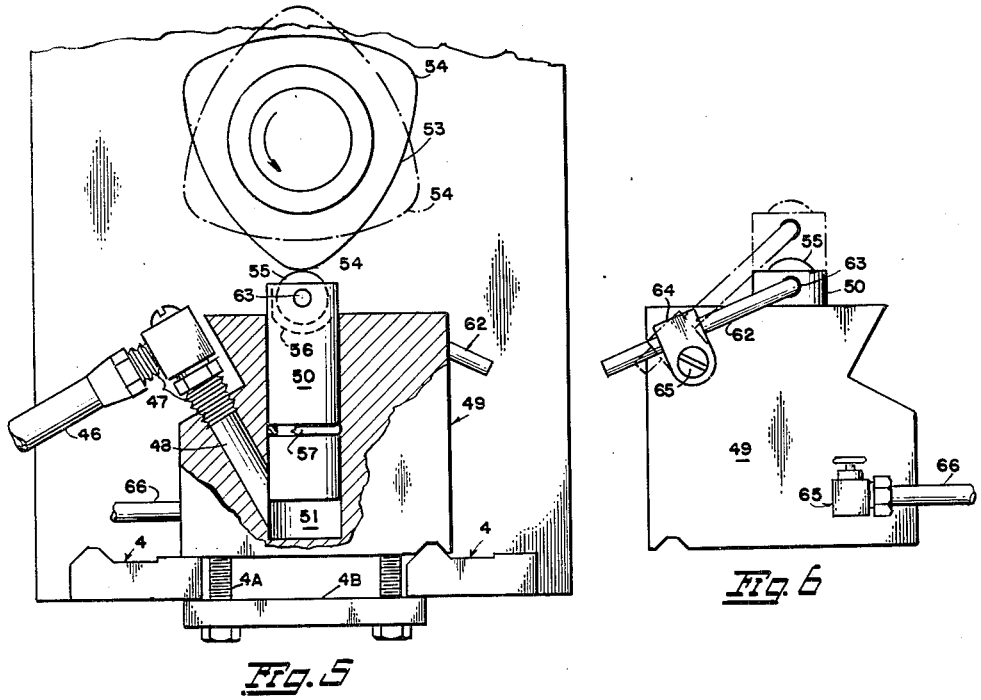
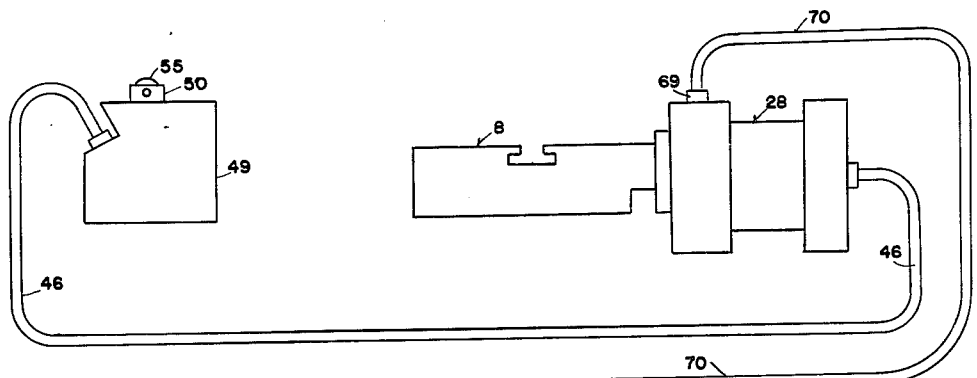
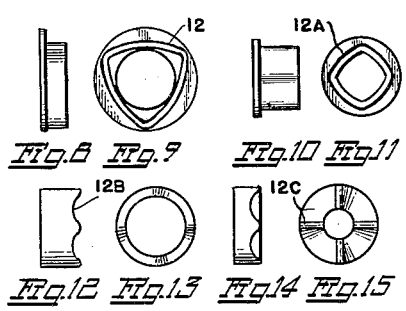
DONALD W. BANKE
INVENTOR.
BY James L. Livnau
ATT'Y United States Patent Office 3,212,371
Patented Oct. 19, 1965

3,212,371
CAM-OPERATED TURNING, BORING AND
FACING ATTACHMENT FOR LATHES
Donald W. Banke, 245 SE. 8th St., Beaverton, Oreg.
Filed June 26, 1962, Ser. No. 205,380
3 Claims. (Cl. 82—19)

This invention relates generally to developments in attachments adapted for use with lathes of various kinds for turning, boring, and facing work pieces.

More particularly, the invention relates to a duplicating attachment of the character described whose principal object is to provide cams or templates of various profiles and configurations adapted for selective use with the lathe spindle and rotated in unison with a workpiece in cooperation with a cam follower for imparting and regulating either transverse or longitudinal movement of a tool ram and tool carried thereby, which in turn is pivotally mounted on the lathe cross-slide for respectively facing of the workpiece to duplicate the cam or for turning and/or boring the workpiece to similarly duplicate the cam.

Another object is to provide new and improved hydraulic means for maintaining the follower in contact with the cam under substantially uniform pressure sufficient to maintain intimate contact without objectionable wear and to insure accurate reproduction of the cam.

Another object resides in the provision of hydraulic means operable automatically to compensate for variations in the contact pressure between the cam and the follower tending to result from the inertia forces set up by eccentricities on the perimeter of the rapidly rotating cam thereby insuring a uniform pressure at all times, and hence improving accuracy and avoiding objectionable and localized wear.

A further object of this invention is to embody the principles thereof in grinding apparatus wherein it is sought to reproduce the workpiece from a templet.

A further object is the provision of means incorporated in one of the valves in the fluid pressure conduits for bleeding air from the system when the valve is in either an open or closed position.

A still further object is the provision of a hydraulic system wherein fluid pressure can be supplied from any suitable pump and accumulator and wherein the accumulator may be spring loaded, or wherein pressure can be provided by attaching a bladder (air) or piston (air) type accumulator to any existing source of pressurized air. Thus, the accumulator, although not restrictively forming a part of the present invention, is, however, important to the operation thereof.

The foregoing and other objects and advantages which will become subsequently apparent reside in the details of construction and operation as more fully hereinafter described and claimed, reference being had to the accompanying drawings forming a part hereof and in which:

FIGURE 3 is a fragmentary sectional side elevational view on an enlarged scale of a hydraulic cylinder, having a piston therein, and wherein the cylinder is responsive to fluid under pressure and operatively connected to the tool ram and tool holder of the lathe.

FIGURE 4 is a sectional end elevational view taken approximately along the line 4—4 of FIGURE 3.

FIGURE 5 is a fragmentary sectional elevational view of a cam follower, its housing and mounting means therefor and wherein the cam is operable by the lathe spindle for transmitting fluid pressure to one end of the hydraulic cylinder of FIGURE 3.

FIGURE 6 is a rear elevational view of the cam follower and its housing removed from the mounting shown in FIGURE 5.

FIGURE 7 is a flow diagram of the hydraulic system of this invention.

Each pair of FIGURES 8–9 and 10–11 are respectively side and front elevational views, on a reduced scale, of exemplary shapes of workpieces produced by the turning and boring operations of the invention, and FIGURES 12–13 and 14–15 are similar views of workpieces produced by the facing operation of the invention.

Figure 1:
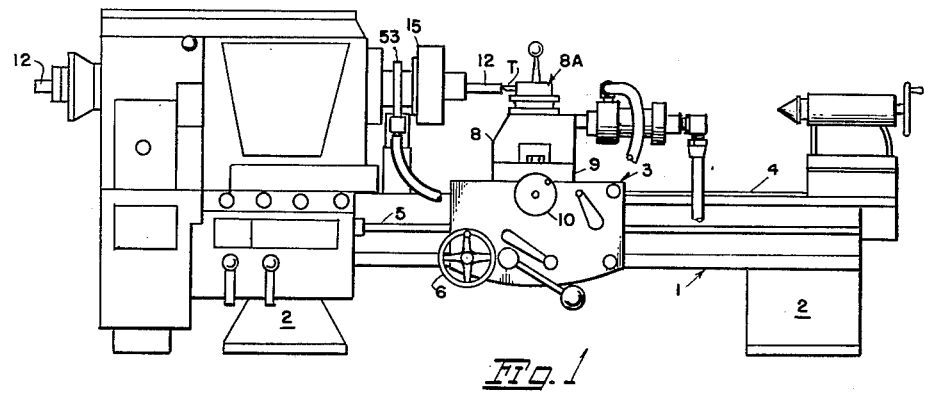
FIGURE 1 is a front elevational view of a standard lathe showing the invention applied thereto for facing the end of a workpiece.
Figure 2:
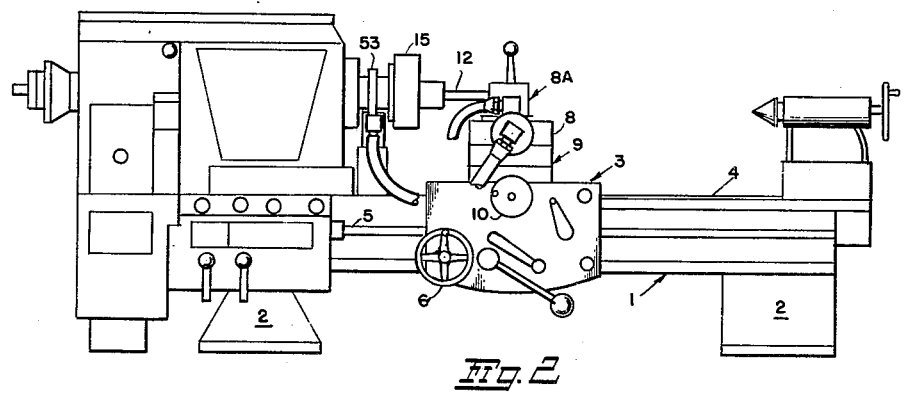
FIGURE 2 is a view similar to FIGURE 1 showing the invention arranged perpendicular to the workpiece for turning and boring operations.

With continuing reference to the drawings wherein like references of character designate like parts, and particularly to FIGURES 1 and 2 thereof, reference numeral 1 indicates generally the lathe bed supported upon legs 2 and provided with a carriage 3 movable lengthwise of the bed ways 4 by a feed screw 5 and hand wheel 6. A tool ram indicated generally at 8 is mounted upon a conventional cross-slide 9 operable by a hand wheel 10.

From the foregoing it will be readily apparent that the tool ram 8 and tool holder 8A carried thereby because of the pivoted mounting of the ram relative to the cross-slide, may be moved lengthwise of the bed ways by the carriage 3 and transversely thereof by the hand wheel 10.

A conventional power driven chuck 15 rotates on a fixed axis for centering and rotating a workpiece 12 about that axis. It is to be understood, of course, that the workpiece may be just as effectively centered and rotated about the axis of a face plate, or a collet or similar workpiece holder used on various kinds of lathes.

The tool ram 8 as best illustrated in FIGURES 3 and 4 is shouldered or undercut along both of its sides as at 16 to accommodate vertical members 17 of a ball race including a horizontal plate 18. The inner faces of the members 17 and the outside adjacent faces of the plate 18 are grooved to rotatably accommodate balls 19. The members 17 are secured to the bottom side portions of tool ram 8 by means of screws 20 whose heads are disposed within counterbored holes 21 in the members 17.

The plate 18 is secured by suitable screws 18A to a base plate 23 which is pivotally mounted upon the cross-slide 9 and lockable thereto as at 24. Thus the tool ram 8 is free to oscillate lengthwise relative to the bed ways 4 when the ram 8 is in the position shown in FIGURE 1 or transversely relative to the bed ways with the ram in the position shown in FIGURE 2.

To achieve such oscillatory movement of the tool ram and to control the extent thereof, I provide a movable hydraulic cylinder 28 closed at one of its ends at 30 and thereat secured as at 31 to the adjacent end of the tool ram 8. A piston 33 on the interior of the cylinder 28 is secured as at 34 to a piston rod 35 whose one end is secured as at 36 to the top end of a post 22 secured to the plate 18 by a set screw 26. This post interconnects the plate 18 and base plate 23 and thus fixedly holds the piston against horizontal movement in either direction relative to the plates 18 and 23. The rod 35 of the piston 33 which isolates the two hydraulic circuits entering the cylinder 28, is provided with a longitudinal duct 37 opening at one of its ends into a space 38 and intermediate its ends into radial seepage ducts 39 extending through the piston rod 35 and piston 33. The opposite end of the piston rod 35 is provided with a longitudinal bore 42 communicating at its inner end with radial ducts 43 and in open communication at its opposite end with a fitting 45 on one end of a fluid pressure conduit 46 whose opposite end (see FIG. 5) is similarly in communication as at 47 with the top end of a duct 48 in a housing 49 for a cam follower 50. The housing 49 is fixedly secured to the bed ways 4 by screws 4A and a clamping plate 4B. The cam follower is operable within a cylinder 51 bored into the housing 49. The bottom end of the duct 48 is in communication with the bottom interior of the cylinder within which the cam follower moves upwardly and downwardly to the extent limited (as indicated by full and broken lines) by the profile of the cam 53 or the lobes 54 thereon. The top end of the cam follower is provided with a roller 55 operable within a lubricant retaining recess 56 and intermediate its ends it is provided with any suitable fluid seal such as an O-ring 57 or the like.

From the foregoing it will be readily apparent that when the conduit 46 is fully charged with fluid pressure such pressure will be of equal amplitude therein and beneath the cam follower 50 in the cylinder 51 and within the space 60 between the right hand end of the piston 33 and the corresponding closed end of the cylinder 28.

For maintaining the cam follower 50 in proper alignment and to keep it from rotating out of proper operational contact with the cam 53 while in reciprocal motion, I provide an arm 62 turned at a right angle at one of its ends as at 63 and thereat extended through and journalled within the top end of the follower 50. The opposite end of the arm 62 is slidably mounted through a pivot block 64 pivotally mounted as at 65 to the housing 49. The approximate range of movement of the arm 62 and block 64 is shown in full and broken lines in FIG. 6. In communication with the cylinder 51 and with a fluid reservoir, not shown, by means of a conduit 66 is a valve 65 which is normally closed but may be selectively opened when desired to replenish any fluid loss in the system.

The space 68 between the closed end 30 of the cylinder 28 and the adjacent end of the stationary piston 33 is in communication through a valve housing 69 and a fluid conduit 70 with the outlet 71 of the accumulator indicated generally at 72 and shown diagrammatically in FIG. 7. This accumulator, as previously pointed out, may be of any suitable type and may be supplied with compressed air through a conduit 74 and provided with a drain cock 75 for drainage purposes when desired or a hydraulic pump may be used in conjunction with various other types of accumulators which may be employed for the purpose intended.

The valve housing 69 is provided with a manually operable valve 80 cooperating with a valve seat 81. Surrounding the valve 80 is an annular groove 82 opening into an air vent 83 normally closed by a screw 84 so that by slightly unseating the screw air may be bled from that part of the hydraulic system when the valve 80 is in either an open or closed position.

From the foregoing it will be seen that of the two fluid circuits communicating with the cylinder 28, one (circuit 70) provides a constant but oscillating supply of fluid pressure generated by the pump-accumulator 72 to the interior of one end of the cylinder 28, and that the other (circuit 46) is at all times fully charged with fluid pressure when circuit 70 is operative as are the opposite end of the cylinder 28 and the cam-follower cylinder 51.

Modus operandi

Rotation of the lathe spindle and hence the cam 53 with the cam follower in intimate contact therewith fluid movement under pressure will be transmitted by the downstroke of the cam follower through circuit 46 to the interior of the right hand end of the cylinder 28. This pressure reacting against the corresponding end of the stationary piston 33 will cause the cylinder and hence the tool ram 8 and tool T carried thereby to move to the right as viewed in FIGURES 1 and 3 and to an extent precisely equal to the throw of the cam and the resultant downward movement of the cam follower 50. Pressure from within the resultant diminishing space 68 at the opposite end of the cylinder is transmitted back to the pump-accumulator through conduit 70.

During the upstroke of the cam follower, still in intimate contact with the cam 53, the pressure flow just described will be reversed, that is to say, pressure from the now diminishing space 60 within the right hand of cylinder 28 will be reversed to the cam follower cylinder 51 while at the same time pressure within the now increasing space 68 within the cylinder 28 is being replenished by fluid pressure from the pump-accumulator through conduit 70.

Thus, pressure compensating means are provided for maintaining the cam and follower engagement constant and uniform in transmitting oscillatory motion to the tool ram 8 resulting in accurate tool cutting duplication in the workpiece of the cam 53.

Such duplicating of the cam 53 by the turning operation is indicated by the outer peripheral surface 12 of the workpiece in FIGURE 9. The shape of the outer peripheral surface 12A of the workpiece in FIGURE 11 would be produced in the turning operation by a cam matching that shape. The same applies to the production or formation of the inner peripheries of the surfaces just referred to in FIGURES 9 and 11 and the openings through those workpieces defined by or within said inner peripheries would be produced by the boring operation.

By rotating the tool ram through 90 degrees relative to the cross-slide from the position shown in FIGURE 1, to that shown in FIGURE 2, the faces 12B and 12C in FIGURES 12–13 and 14–15 would be produced by a cam on the spindle matching those last mentioned faces.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A lathe comprising a reciprocal carriage,
   a lathe cross-slide,
   means mounting the cross-slide for movement transversely of said carriage,
   a base,
   a tool ram,
   means reciprocally mounting said ram to said base,
   a tool carried by the ram,
   means pivotally mounting said base upon said cross-slide,
   a fluid reciprocated cylinder,
   means fixedly securing said cylinder to said ram for imparting reciprocal movement to the ram,
   a stationary piston within said cylinder,
   means connecting said piston to said base whereby said cylinder and ram are movable relative to the base,
   a housing,
   a rotatable cam within said housing,
   a cam follower within said housing,
   means rotating a workpiece in unison with said rotatable cam,
   a fluid pressure system including a source of fluid pressure,
   means directing fluid flow under pressure from the source to the interior of one end of said cylinder,
   means operable by said rotatable cam for directing fluid flow undre pressure to the interior of the other end of said cylinder to thereby govern cylinder actuated movement of asid tool ram and tool relative to said cross-slide,
   means for holding said cam follower in proper operational contact with said cam,
   said means comprising an arm journalled at one of its ends in said cam follower,
   a guide comprising a block pivotally mounted to said cam follower housing and having a slide bearing therethrough, and
   the opposite end of said arm slidably mounted within said slide bearing.

2. In a lathe having a reciprocal carriage, a lathe cross-slide and means mounting the cross-slide for movment transversely of the cariage, the improvement comprising;
  an attachment for turning, boring and facing workpieces comprising,
  a base,
  means pivotally mounting the base to the cross-slide,
  a tool ram,
  a tool carried by the ram,
  means reciprocally mounting the ram and hence the tool upon said base,
  a source of fluid pressure,
  a fluid reciprocated cylinder,
  means securing said tool ram to said cylinder for reciprocal movement with the cylinder,
  a manipulative valve in communication with the interior of one end of said cylinder,
  a stationary piston within said cylinder,
  means connecting said piston to said tool ram base,
  a rotatable cam,
  means rotating a workpiece in unison with said cam,
  first conduit means supplying fluid pressure from said source through said manipulative valve to the interior of said one end of said cylinder,
  a housing having a cylindrical bore therein,
  a reciprocating cam follower within said bore and at all times in intimate contact with said cam,
  second fluid pressure conduit means in open communication at one of its ends with said bore in said housing and at its opposite end with the interior of the opposite end of said cylinder.

3. An attachment as claimed in claim 2 wherein said valve means comprises a valve housing in communication through an outlet with said one end of said cylinder,
  a valve seat within said valve housing,
  a manipulative valve body cooperating with the valve seat,
  said valve housing having a normally closed annular groove therein surrounding said valve body and in communication with said outlet,
  means for selectively opening said groove to the atmosphere whereby air may be bled from said first fluid pressure conduit means with said valve body in either an open or closed position relative to said valve seat.

References Cited by the Examiner
UNITED STATES PATENTS

| | | | |
|---|---|---|---|
| 2,146,774 | 2/39 | Snader | 82—19 |
| 2,192,267 | 3/40 | Kelley | 82—19 |
| 2,375,831 | 5/45 | Turchan et al. | 82—19 |
| 2,403,581 | 7/46 | Cosella | 82—24 |
| 2,587,542 | 2/52 | Siekmann et al. | |
| 2,721,494 | 10/55 | Whitfield | 82—19 |
| 3,057,235 | 10/62 | Mey | 82—19 |
| 3,062,080 | 11/62 | Poorman | 82—24 |

WILLIAM W. DYER, Jr., *Primary Examiner.*